United States Patent
Cheng et al.

(10) Patent No.: US 8,159,197 B2
(45) Date of Patent: Apr. 17, 2012

(54) CIRCUIT AND METHOD FOR CONSTANT ON-TIME CONTROL FOR AN INTERLEAVED MULTIPHASE VOLTAGE REGULATOR

(75) Inventors: Chung-Sheng Cheng, Jhubei (TW); Jian-Rong Huang, Hsinchu (TW); Chung-Shu Li, Yonghe (TW)

(73) Assignee: Richtek Technology Corp., Hsinchu (TW)

( * ) Notice: Subject to any disclaimer, the term of this patent is extended or adjusted under 35 U.S.C. 154(b) by 402 days.

(21) Appl. No.: 12/585,219

(22) Filed: Sep. 9, 2009

(65) Prior Publication Data

US 2011/0057632 A1   Mar. 10, 2011

(30) Foreign Application Priority Data

Sep. 10, 2008   (TW) .................................. 97134744 A

(51) Int. Cl.
*G05F 1/40*   (2006.01)

(52) U.S. Cl. .......................... 323/242; 323/246; 323/285
(58) Field of Classification Search .................. 323/237, 323/242, 246, 282, 284, 285, 288
See application file for complete search history.

(56) References Cited

U.S. PATENT DOCUMENTS

| | | | |
|---|---|---|---|
| 6,414,470 B1 * | 7/2002 | Liu et al. ........................ | 323/272 |
| 6,801,030 B2 * | 10/2004 | Tai et al. ..................... | 324/117 R |
| 6,897,636 B2 * | 5/2005 | Harris .............................. | 323/272 |
| 6,912,144 B1 * | 6/2005 | Clavette .......................... | 363/98 |
| 7,772,811 B1 * | 8/2010 | Jain et al. ...................... | 323/224 |
| 8,044,645 B2 * | 10/2011 | Zambetti et al. ............... | 323/272 |

* cited by examiner

*Primary Examiner* — Jessica Han
(74) *Attorney, Agent, or Firm* — Rosenberg, Klein & Lee

(57) ABSTRACT

A circuit and method are proposed for constant on-time control for an interleaved multiphase voltage regulator, which monitor the channel currents of all the channels of the interleaved multiphase voltage regulator to select one from the channels to drive and so achieve interleaved phase operation.

6 Claims, 10 Drawing Sheets

CIRCUIT AND METHOD FOR CONSTANT ON-TIME CONTROL FOR AN INTERLEAVED MULTIPHASE VOLTAGE REGULATOR

FIELD OF THE INVENTION

The present invention is related generally to a voltage regulator and, more particularly, to a multiphase voltage regulator with constant on-time control.

BACKGROUND OF THE INVENTION

Most of conventional multiphase voltage regulators adopt individual modulators for each phase or constant switching frequency control. The individual modulators receive synchronous ramp signals, respectively, for realizing interleaved phase operation. The constant switching frequency control achieves interleaved operation with multiple phases by use of fixed phase sequence and time intervals. The fixed-phase-sequence interleaved operation uses synchronous constant-time phase-shifted signals to drive the parallel coupled phases.

As shown in FIG. 1, a conventional fixed-phase-sequence interleaved voltage regulator 10 includes multiple channels 12, 14, and 16 to convert an input voltage Vin into an output voltage V0, an error amplifier 36 to monitor the output voltage V0 to generate an error signal Vc, an adder 30 to combine the error signal Vc with the channel current IL1 of the channel 12 to generate an error signal Vc1, a modulator 18 having a comparator 20 to compare the error signal Vc1 with a ramp signal Vramp1 to generate a control signal PWM1 to drive the channel 12, an adder 32 to combine the error signal Vc with the channel current IL2 of the channel 14 to generate an error signal Vc2, a modulator 22 having a comparator 24 to compare the error signal Vc2 with a ramp signal Vramp2 to generate a control signal PWM2 to drive the channel 14, an adder 34 to combine the error signal Vc with the channel current ILN of the channel 16 to generate an error signal VcN, and a modulator 26 having a comparator 28 to compare the error signal VcN with a ramp signal VrampN to generate a control signal PWMN to drive the channel 16.

FIG. 2 is a circuit diagram of a conventional multiphase voltage regulator 40 with constant on-time control, which is also referred to as variable switching frequency control, and FIG. 3 is a waveform diagram of the multiphase voltage regulator 40. The multiphase voltage regulator 40 includes multiple channels 42, 44 and 46 to convert an input voltage Vin into an output voltage V0, an error amplifier 72 to monitor the output voltage V0 to generate an error signal Vc, an adder 66 to combine the channel current IL1 of the channel 42 with the error signal Vc to generate an error signal Vc1, a modulator 54 having a comparator 56 to compare the error signal Vc1 with a ramp signal Vramp1 to generate a signal Ramp1 as shown by the waveform 84, an on-time generator 48 to generate a constant on-time signal PWM1 as shown by the waveform 78 according to the signal Ramp1 to drive the channel 42, an adder 68 to combine the channel current IL2 of the channel 44 with the error signal Vc to generate an error signal Vc2, a modulator 58 having a comparator 60 to compare the error signal Vc2 with a ramp signal Vramp2 to generate a signal Ramp2 as shown by the waveform 82, an on-time generator 50 to generate a constant on-time signal PWM2 as shown by the waveform 76 according to the signal Ramp2 to drive the channel 44, an adder 70 to combine the channel current ILN of the channel 46 with the error signal Vc to generate an error signal VcN, a modulator 62 having a comparator 64 to compare the error signal VcN with a ramp signal VrampN to generate a signal RampN as shown by the waveform 80, and an on-time generator 52 to generate a constant on-time signal PWMN as shown by the waveform 74 according to the signal RampN to drive the channel 46.

The switching frequency of the multiphase voltage regulator 40 with constant on-time control varies with its loading, and thus the switching loss also varies with the loading. In other words, when the multiphase voltage regulator 40 operates with a lower switching frequency, its switching loss is small and thus it is superior to the multiphase voltage regulator 10 in term of efficiency. However, since the switching period of the multiphase voltage regulator 40 is not constant, it is unable to perform interleaved phase operation by dividing the switching period, as does the multiphase voltage regulator 10. That is, it is difficult for the multiphase voltage regulator 40 to achieve interleaved phase operation.

Therefore, it is desired a simple solution for implementation of constant on-time control for an interleaved multiphase voltage regulator.

SUMMARY OF THE INVENTION

An object of the present invention is to provide a circuit for constant on-time control for an interleaved multiphase voltage regulator.

Another object of the present invention is to provide a method for constant on-time control for an interleaved multiphase voltage regulator.

According to the present invention, a circuit for constant on-time control for an interleaved multiphase voltage regulator includes an error amplifier to monitor the output voltage of the voltage regulator to generate a first error signal, an adder to sum up all channel currents of the voltage regulator to generate a summation signal to be combined with the first error signal to thereby generate a second error signal, a modulator to generate a modulation signal according to the second error signal and a ramp signal, an on-time generator to generate a control signal according to the modulation signal to drive a selected one from the plurality of channels, and a lowest current comparator to monitor the channel current of the selected channel to determine whether to enable the on-time generator.

According to the present invention, a method for constant on-time control for an interleaved multiphase voltage regulator includes monitoring the output voltage of the voltage regulator to generate a first error signal, summing up all channel currents of the voltage regulator to generate a summation signal to be combined with the first error signal to thereby generate a second error signal, generating a modulation signal according to the second error signal and a ramp signal, monitoring the channel currents to select one from the channels, and generating a control signal according to the modulation signal to drive the selected channel.

The control signal is generated according to the output voltage, the summation of the channel currents and the ramp signals, and the operational phase sequence is determined by using the lowest current comparator to monitor the channel currents. Therefore, interleaved phase operation is available for a multiphase voltage regulator with constant on-time control.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
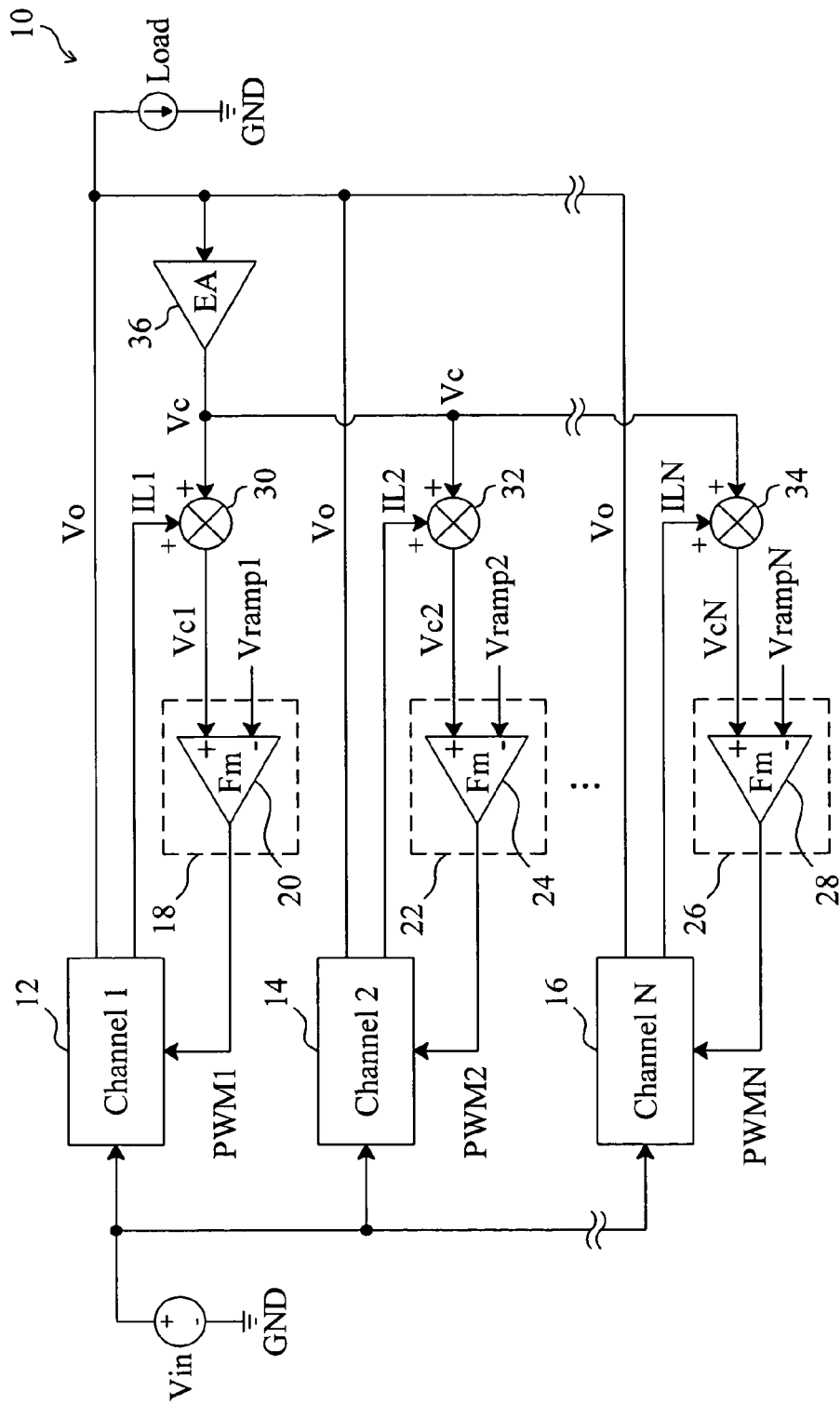
FIG. 1 is a circuit diagram of a conventional fixed-phase-sequence interleaved voltage regulator.
Figure 2:
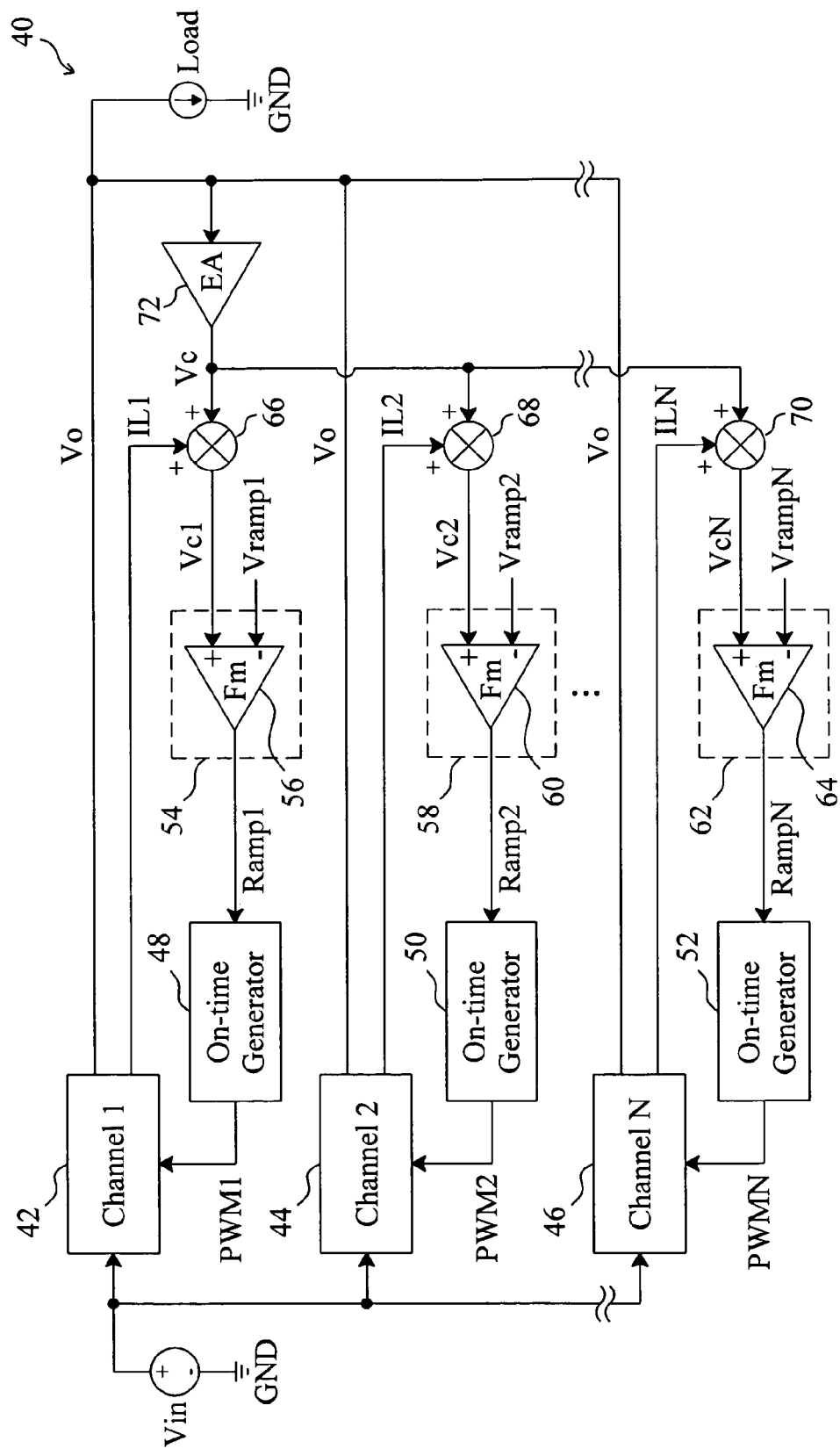
FIG. 2 is a circuit diagram of a conventional multiphase voltage regulator with constant on-time control.
Figure 3:
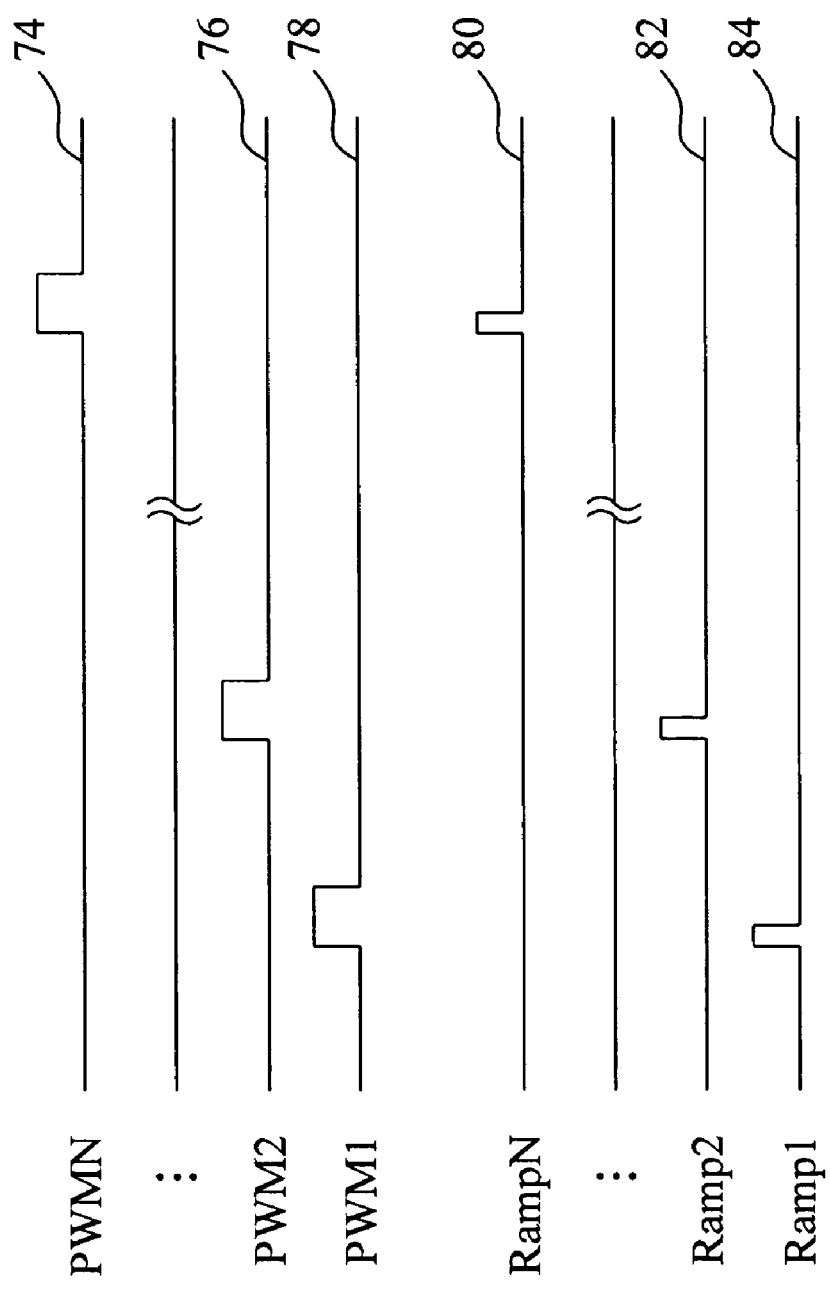
FIG. 3 is a waveform diagram of the multiphase voltage regulator shown in FIG. 2.
Figure 4:
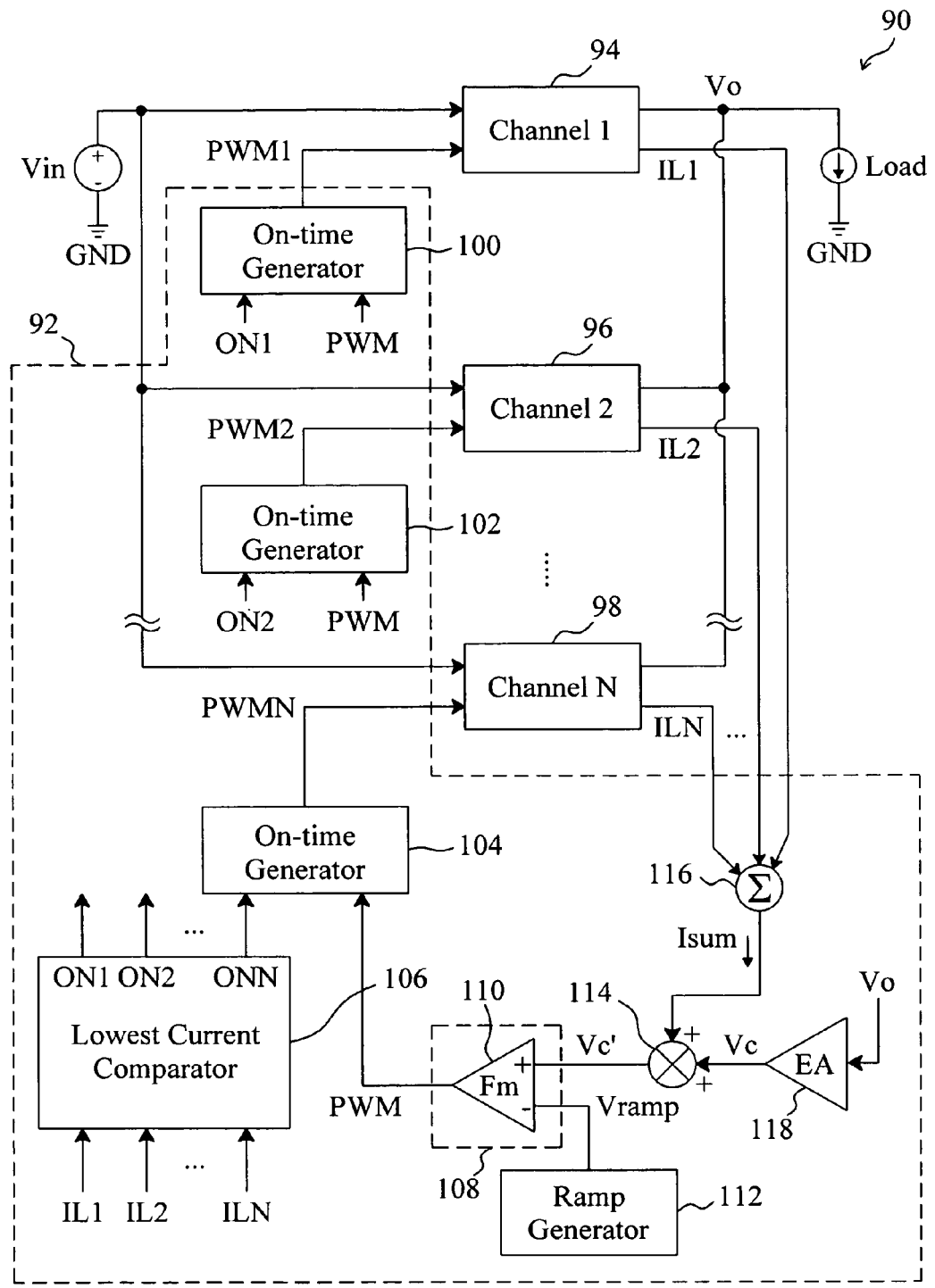
FIG. 4 is a circuit diagram of a first embodiment according to the present invention.

FIG. 4 is a circuit diagram of a first embodiment according to the present invention, in which a buck multiphase voltage regulator 90 with constant on-time control includes multiple channels 94, 96 and 98 to convert an input voltage Vin into an output voltage Vo, and a control circuit 92 to provide control signals PWM1, PWM2 and PWMN for driving the channels 94, 96 and 98. In the control circuit 92, an error amplifier 118 monitors the output voltage Vo to generate an error signal Vc, an adder 116 sums up the channel currents IL1, IL2 and ILN of all the channels 94, 96 and 98 to generate a summation signal Isum, an adder 114 combines the error signal Vc and the summation signal Isum to generate an error signal Vc', a modulator 108 has a comparator 110 to compare the error signal Vc' with a ramp signal Vramp provided by a ramp generator 112 to generate a modulation signal PWM, on-time generators 100, 102 and 104 generate the control signals PWM1, PWM2 and PWMN according to the modulation signal PWM for driving the channels 94, 96 and 98 respectively, and a lowest current comparator 106 monitors the channel currents IL1, IL2 and ILN of to provide the enable signals ON1, ON2 and ONN for determining whether to enable the on-time generators 100, 102 and 104.

Figure 5:
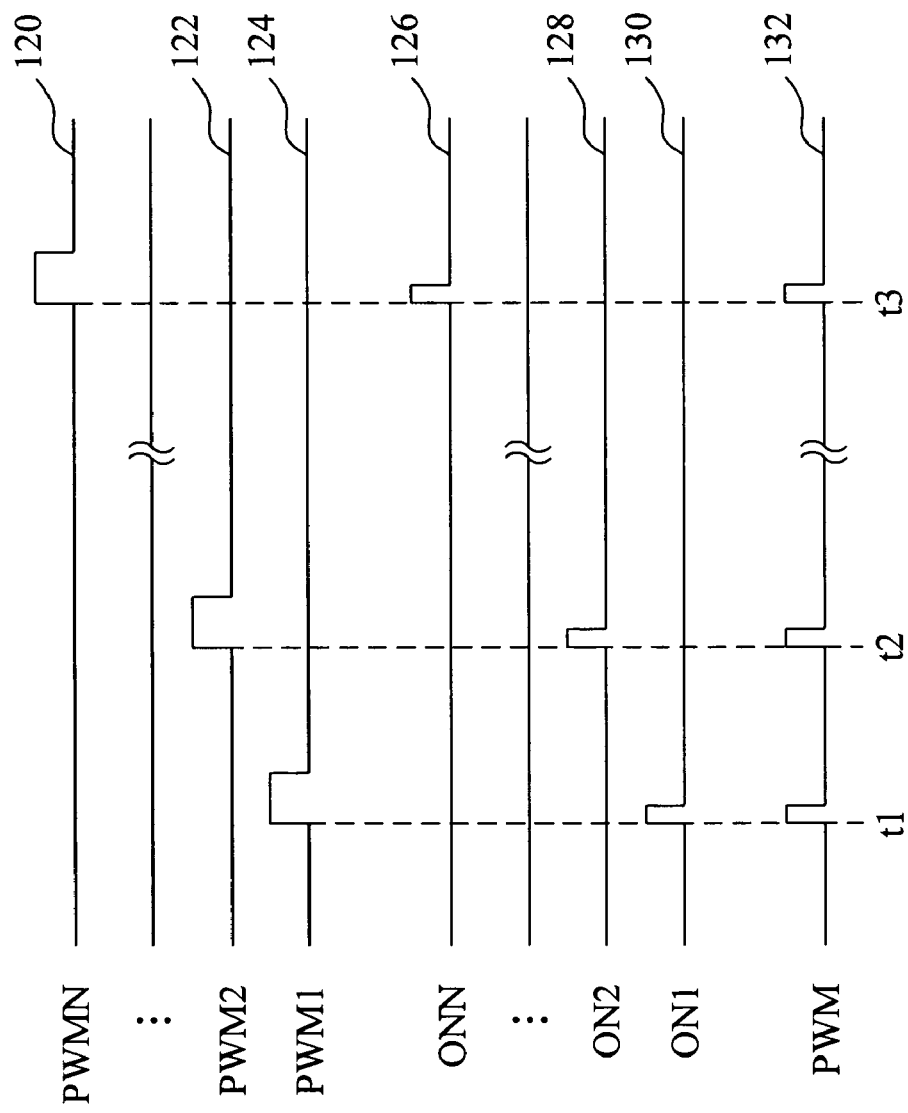
FIG. 5 is a waveform diagram of the multiphase voltage regulator shown in FIG. 4.

FIG. 5 is a waveform diagram of the multiphase voltage regulator 90, in which waveform 120 represents the control signal PWMN, waveform 122 represents the control signal PWM2, waveform 124 represents the control signal PWM1, waveform 126 represents the enable signal ONN, waveform 128 represents the enable signal ON2, waveform 130 represents the enable signal ON1, and waveform 132 represents the modulation signal PWM. As shown in FIG. 4, the lowest current comparator 106 monitors the channel currents IL1, IL2 and ILN to determine an operation phase sequence for interleaved operation of the buck multiphase voltage regulator 90. When the modulation signal PWM transits to high, the lowest current comparator 106 detects all the channel currents IL1, IL2 and ILN to enable one of the on-time generators 100, 102 and 104, so as to generate a control signal for turning on an high side switch of the channel having the minimum channel current. For example, as shown in FIG. 5, at time t1, the modulation signal PWM transits to high as shown by the waveform 132, the lowest current comparator 106 detects that the channel current IL1 of the channel 94 is the minimum one and accordingly triggers the enable signal ON1 to enable the on-time generator 100, so as to generate the control signal PWM1 for driving the channel 94, as shown by the waveforms 124 and 130. At time t2, the modulation signal PWM transits to high again, the lowest current comparator 106 detects that the channel current IL2 of the channel 96 is the minimum one and accordingly triggers the enable signal ON2 to enable the on-time generator 102, so as to generate the control signal PWM2 for driving the channel 96, as shown by the waveforms 122 and 128. At time t3, the modulation signal PWM transits to high again, the lowest current comparator 106 detects that the channel current ILN of the channel 98 is the minimum one and accordingly triggers the enable signal ONN to enable the on-time generator 104, so as to generate the control signal PWMN for driving the channel 98, as shown by the waveforms 120 and 126.

Figure 6:
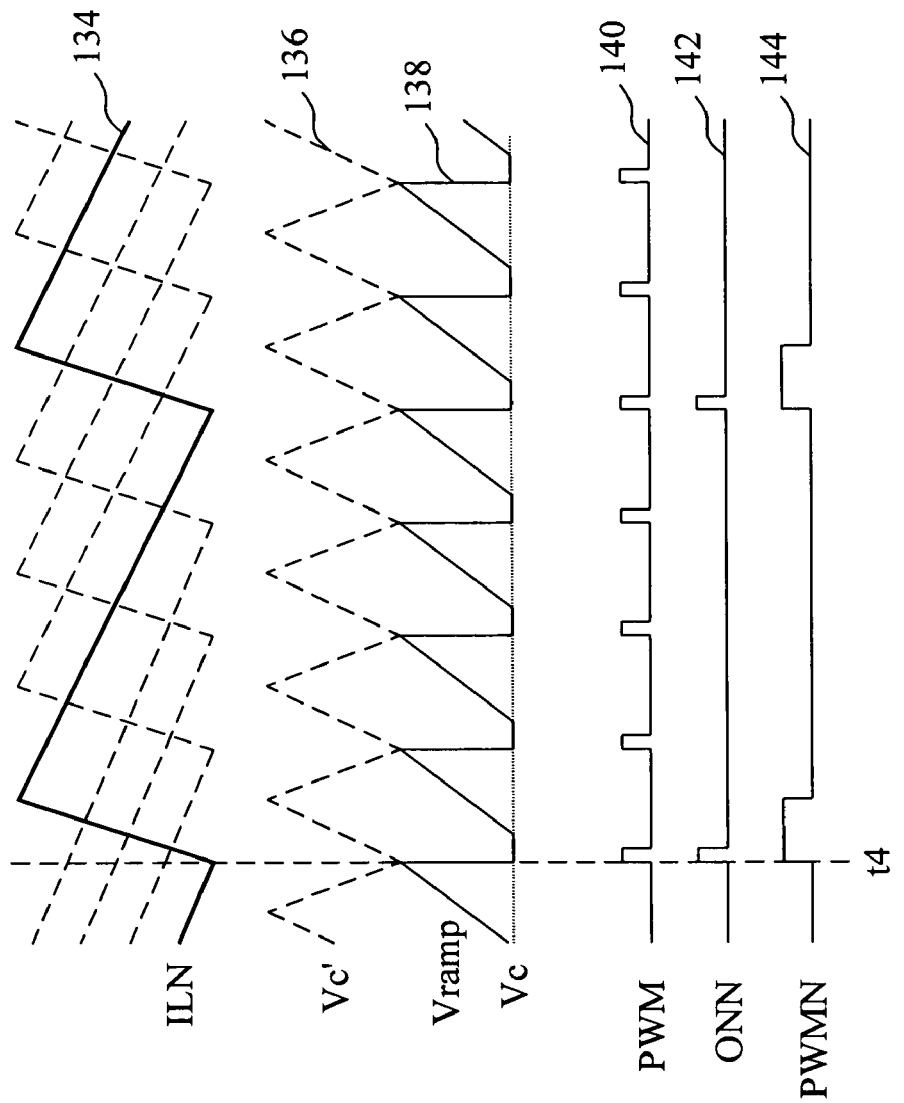
FIG. 6 is another waveform diagram of the multiphase voltage regulator shown in FIG. 4.

FIG. 6 is another waveform diagram of the multiphase voltage regulator 90, in which waveform 134 represents the channel current ILN, waveform 136 represents the error signal Vc', waveform 138 represents the ramp signal Vramp, waveform 140 represents the modulation signal PWM, waveform 142 represents the enable signal ONN, and waveform 144 represents the control signal PWMN. As shown in FIG. 4, the error signal Vc' is produced from the summation signal Isum of all the channel currents and the error signal Vc, so the valley of the error signal Vc' represents that one of the channel currents IL1, IL2 and ILN reaches its lowest value. For instance, at time t4, the channel current ILN of the Nth channel 98 reaches the valley as shown by the waveform 134, and the error signal Vc' also, reaches its valley as shown by the waveform 136. At this time, the ramp signal Vramp is greater than the error signal Vc' as shown by the waveform 138. Therefore, the comparator 110 will the modulation PWM as shown by the waveform 140, and the lowest current comparator 106 detects that the channel current ILN of the Nth channel 98 reaches its valley and thus triggers the enable signal ONN to enable the on-time generator 104 for generating the control signal PWMN, as shown by the waveforms 142 and 144.

The multiphase voltage regulator 90 achieves interleaved phase operation by monitoring the minimum channel current, so it allows for a random phase sequence and as a result, the multiphase voltage regulator 90 is able to realize dynamic current balancing for eliminating beat frequency oscillation which is generated when driving channels of a multiphase voltage regulator with a fixed phase sequence.

Figure 7:
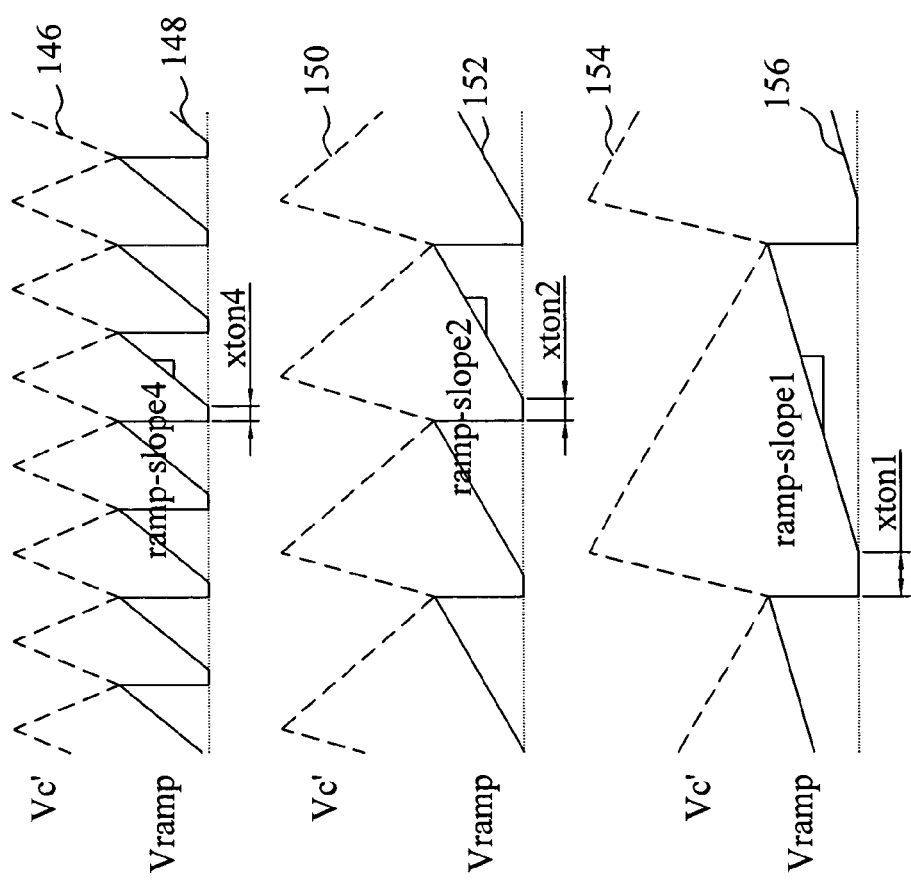
FIG. 7 is a diagram showing various designs of the ramp signal Vramp for a multiphase voltage regulator of FIG. 4 having different numbers of channels.

FIG. 7 is a diagram showing various designs of the ramp signal Vramp for a multiphase voltage regulator 90 having different numbers of channels, in which waveform 146 represents the error signal Vc', waveform 148 represents the ramp signal Vramp, waveform 150 represents the error signal Vc', waveform 152 represents the ramp signal Vramp, waveform 154 represents the error signal Vc', and waveform 156 represents the ramp signal Vramp. If a multiphase voltage regulator with constant on-time control has only a single phase, the error signal Vc' and the ramp signal Vramp are shown by the waveforms 154 and 156 at the lower portion of FIG. 7. In each cycle, the ramp signal Vramp increases with a slope ramp_slope1 after a blank period xton1 which is used to reset the ramp signal Vramp so as to ensure that the ramp signal Vramp increases from the same level in each cycle. If a multiphase voltage regulator with constant on-time control has two phases, the error signal Vc' and the ramp signal Vramp are shown by the waveforms 150 and 152 at the middle portion of FIG. 7. In each cycle, the ramp signal Vramp increases with a slope ramp_slope2 after a blank period xton2, where xton2=xton1/2, and ramp_slope2=2×ramp_slope1. If a multiphase voltage regulator with constant on-time control has four phases, the error signal Vc' and the ramp signal Vramp are shown by the waveforms 146 and 148 at the upper portion of FIG. 7. In each cycle, the ramp signal Vramp increases with a slope ramp_slope4 after a blank period xton4, where xton4=xton1/4, and ramp_slope4=4×ramp_slope1. Generally, for a multiphase voltage regulator with constant on-time control having N phases, the ramp signal Vramp has the blank period $$xtonN=xton1/N,\qquad\text{[EQ-1]}$$

and the increasing slop $$ramp\_slopeN=N\times ramp\_slope1.\qquad\text{[EQ-2]}$$

Figure 8:
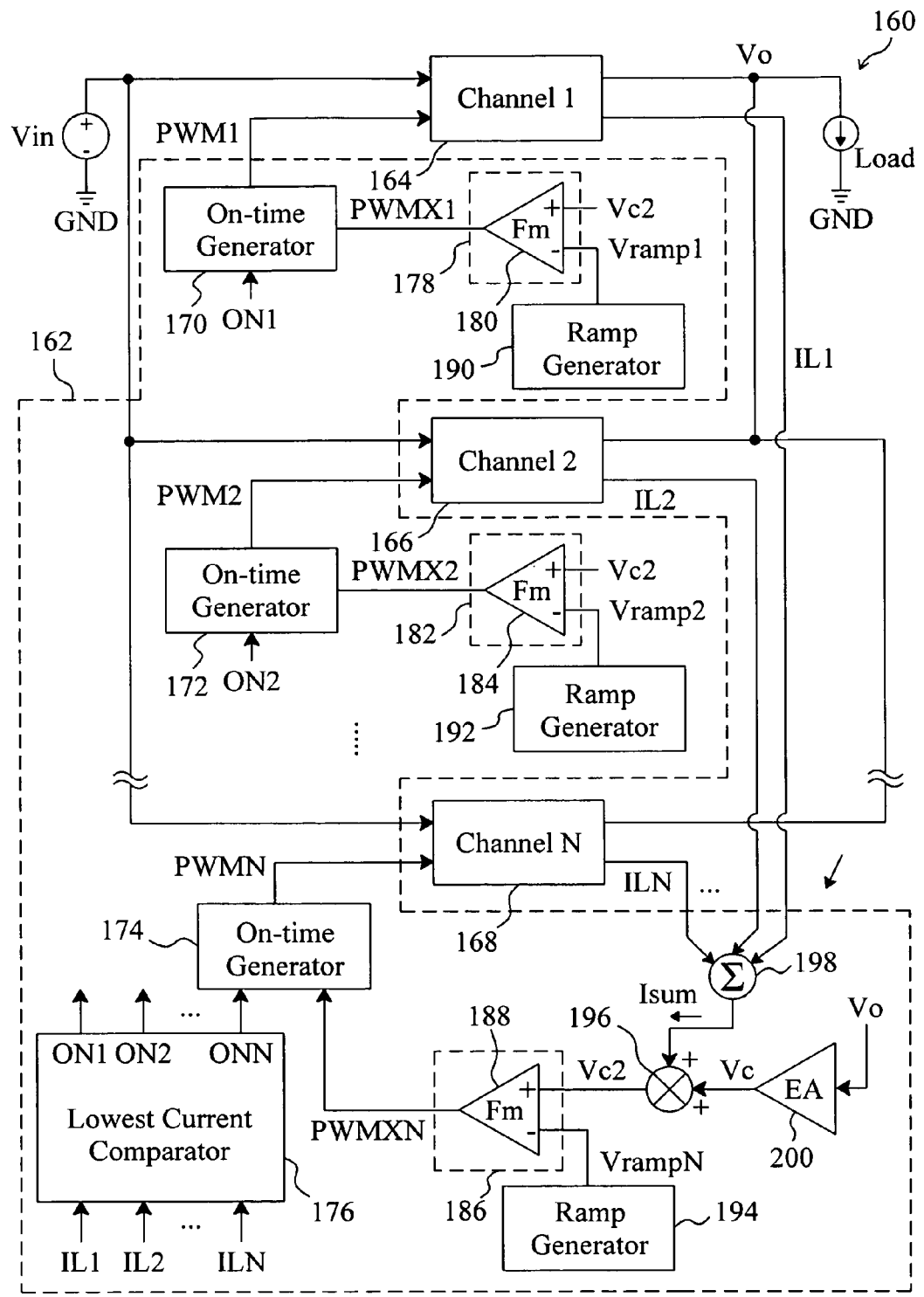
FIG. 8 is a circuit diagram of a second embodiment according to the present invention.

FIG. 8 is a circuit diagram of a second embodiment according to the present invention, in which a buck multiphase voltage regulator 160 with constant on-time control has multiple channels 164, 166 and 168 for converting an input voltage Vin into an output voltage V0, and a control circuit 162 to provide control signals PWM1, PWM2 and PWMN for driving the channels 164, 166 and 168. In the control circuit 162, an error amplifier 200 monitors the output voltage V0 to generate an error signal Vc, an adder 198 sums up the channel currents ILL IL2 and ILN of all the channels 164, 166 and 168 to generate a summation signal Isum, an adder 196 combines the error signal Vc and the summation signal Isum to generate an error signal Vc2, a modulator 178 has a comparator 180 to compare the error signal Vc2 with a ramp signal Vramp1 provided by a ramp generator 190 to generate a modulation signal PWMX1, an on-time generator 170 generates a control signal PWM1 according to the modulation signal PWMX1 to drive the channel 164, a modulator 182 has a comparator 184 to compare the error signal Vc2 with a ramp signal Vramp2 provided by a ramp generator 192 to generate a modulation signal PWMX2, an on-time generator 172 generates a control signal PWM2 according to the modulation signal PWMX2 to drive the channel 166, a modulator 186 has a comparator 188 to compare the error signal Vc2 with a ramp signal VrampN provided by a ramp generator 194 to generate a modulation signal PWMXN, an on-time generator 174 generates a control signal PWMN according to the modulation signal PWMXN to drive the channel 168, and a lowest current comparator 176 monitors the channel currents ILL IL2 and ILN to generate enable signals ON1, ON2 and ONN for determining whether to enable the on-time generators 170, 172 and 174. In this embodiment, each of the channels 164, 166 and 168 has its own modulator 178, 182 and 186, respectively. Moreover, each of the ramp signals Vramp1, Vramp2 and VrampN has a frequency identical to a same switching frequency. The ramp signals Vramp1, Vramp2 and VrampN may be controlled by other signals or may be independent signals.

Figure 9:
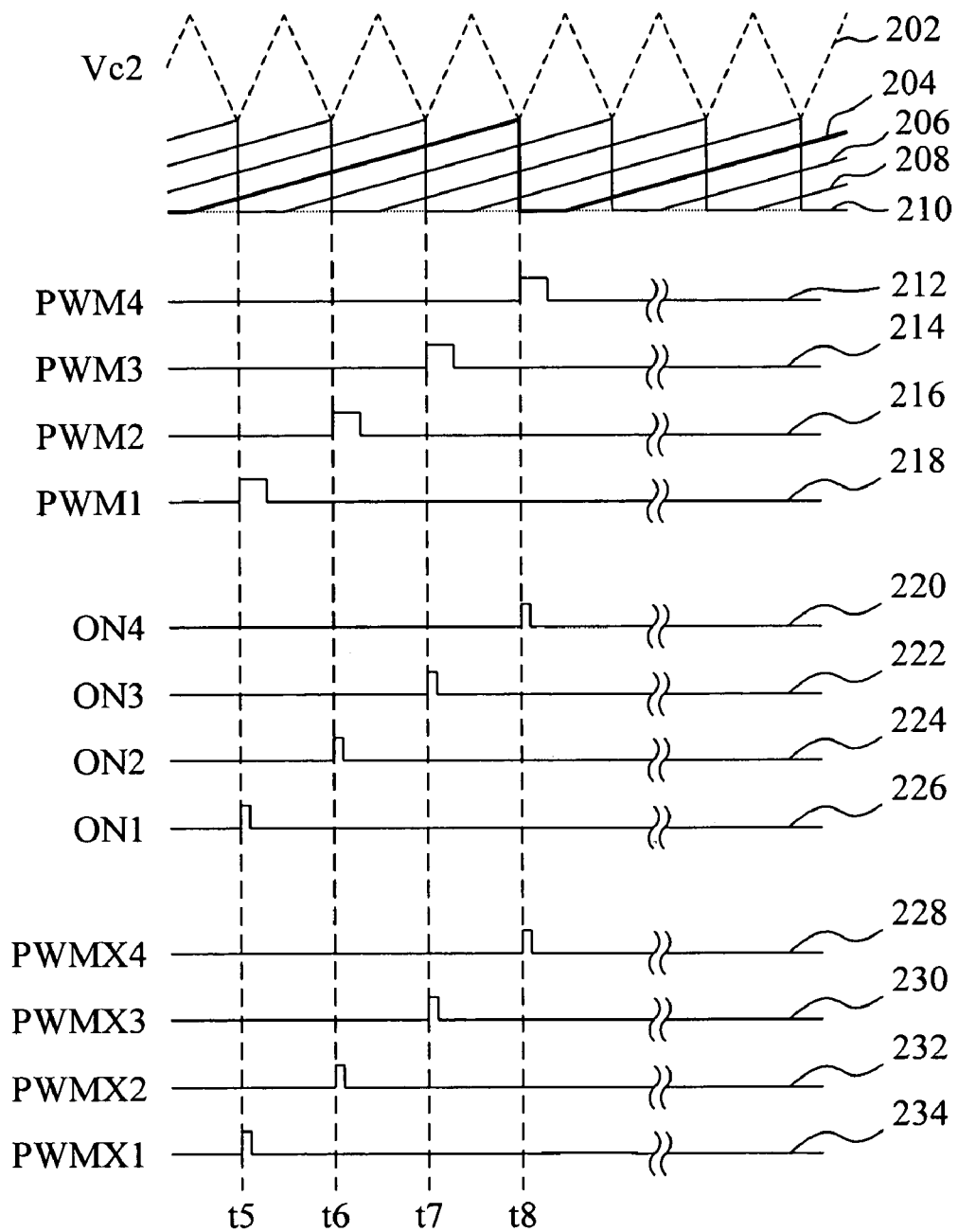
FIG. 9 is a waveform diagram of the multiphase voltage regulator shown in FIG. 8.

FIG. 9 is a waveform diagram of the multiphase voltage regulator 160. For convenience of illustration, the description of operation only refers to the first four channels in the multiphase voltage regulator 160. In FIG. 9, waveform 202 represents the error signal Vc2, waveform 204 represents the ramp signal Vramp4, waveform 206 represents the ramp signal Vramp1, waveform 208 represents the ramp signal Vramp2, waveform 210 represents the ramp signal Vramp3, waveform 212 represents the control signal PWM4 for the fourth channel, waveform 214 represents the control signal PWM3 for the third channel, waveform 216 represents the control signal PWM2 for the second channel, waveform 218 represents the control signal PWM1 for the first channel, waveform 220 represents the enable signal ON4, waveform 222 represents the enable signal ON3, waveform 224 represents the enable signal ON2, waveform 226 represents the enable signal ON1, waveform 228 represents the modulation signal PWMX4 for the fourth channel, waveform 230 represents the modulation signal PWMX3 for the third channel, waveform 232 represents the modulation signal PWMX2 for the second channel, and waveform 234 represents the modulation signal PWMX1 for the first channel. At time t5, the ramp signal Vramp1 is greater than the error signal Vc2 so that the modulation signal PWMX1 transits to high, as shown by the waveforms 206 and 234. Meantime, the lowest current comparator 176 detects that the channel current IL1 of the channel 164 reaches its valley, so it triggers the enable signal ON1 to enable the on-time generator 170 for generating the control signal PWM1, as shown by the waveforms 218 and 226. At time t6, the ramp signal Vramp2 is greater than the error signal Vc2 so that the modulation signal PWMX2 transits to high, as shown by the waveforms 208 and 232. At this time, the lowest current comparator 176 detects that the channel current IL2 of the second channel 166 reaches its valley, so it triggers the enable signal ON2 to enable the on-time generator 172 for generating the control signal PWM2, as shown by the waveforms 216 and 224. At time t7, the ramp signal Vramp3 for the third channel is greater than the error signal Vc2 so that the modulation signal PWMX3 for the third channel transits to high, as shown by the waveforms 210 and 230. Likewise, the lowest current comparator 176 detects that the channel current IL3 of the third channel reaches its valley, so it triggers the enable signal ON3 for generating the control signal PWM3, as shown by the waveforms 214 and 222. At time t8, the ramp signal Vramp4 for the fourth channel is greater than the error signal Vc2 so that the modulation signal PWMX4 for the fourth channel transits to high, as shown by the waveforms 204 and 228. At this time, the lowest current comparator 176 detects that the channel current IL4 of the fourth channel reaches its valley, so it triggers the enable signal ON4 for generating the control signal PWM4, as shown by the waveforms 212 and 220.

Figure 10:
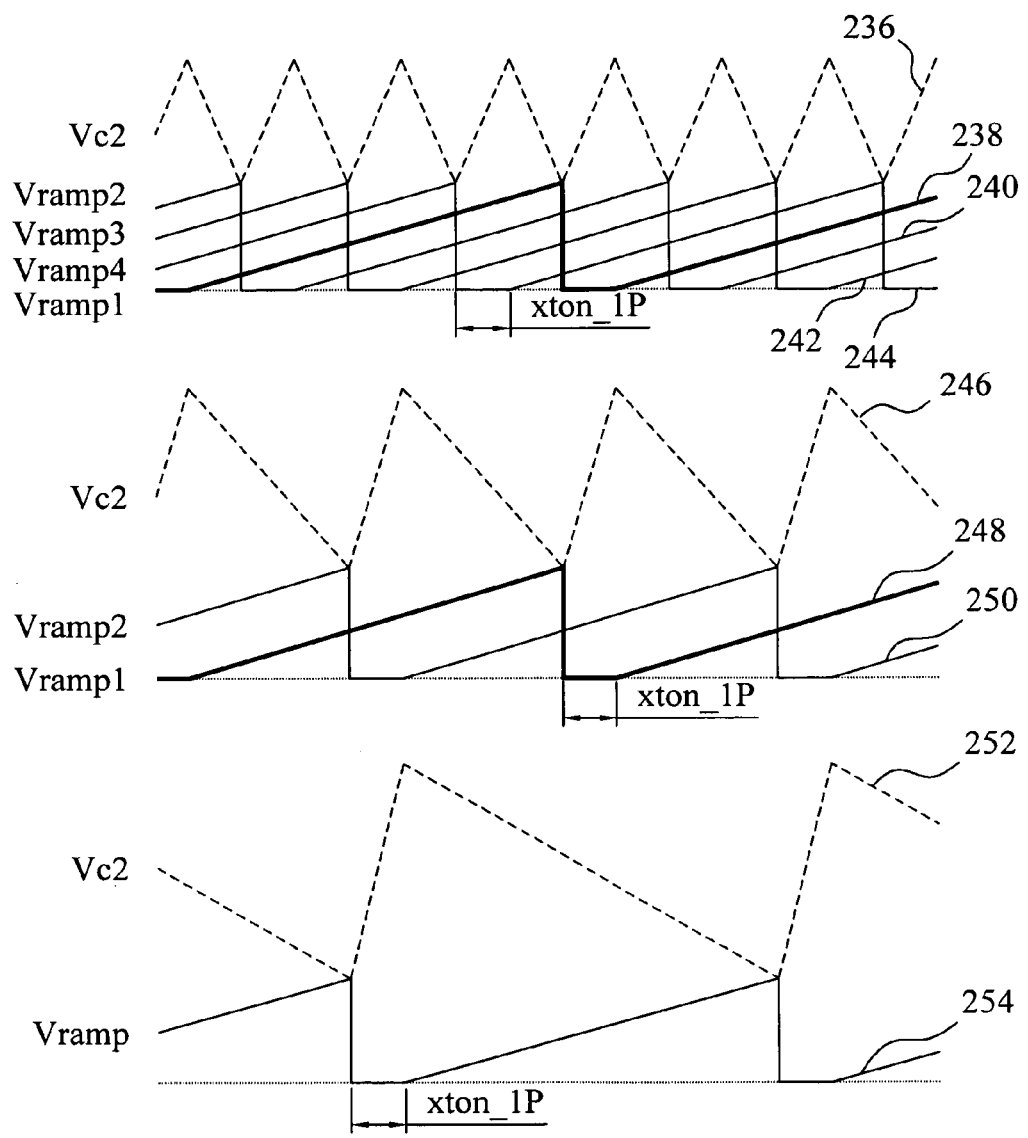
FIG. 10 is a diagram showing various designs of the ramp signal for a multiphase voltage regulator of FIG. 8 having different numbers of channels.

FIG. 10 is a diagram showing various designs of the ramp signal for a multiphase voltage regulator 160 having different numbers of channels 160, in which waveform 236 represents the error signal Vc', waveform 238 represents the ramp signal Vramp1 for the first channel, waveform 240 represents the ramp signal Vramp2 for the second channel, waveform 242 represents the ramp signal Vramp3 for the third channel, waveform 244 represents the ramp signal Vramp4 for the fourth channel, waveform 246 represents the error signal Vc', waveform 248 represents the ramp signal Vramp1 for the first channel, waveform 250 represents the ramp signal Vramp2 for the second channel, waveform 252 represents the error signal Vc', and waveform 254 represents the ramp signal Vramp. If a multiphase voltage regulator 160 with constant on-time control has only a single phase, the error signal Vc' and the ramp signal Vramp are shown by the waveforms 252 and 254 at the lower portion of FIG. 10. In each cycle, the ramp signal Vramp increases after a blank period xton_1P and does not descend until the ramp signal Vramp reaches the error signal Vc'. If a multiphase voltage regulator 160 with constant on-time control has two phases, the error signal Vc', the ramp signal Vramp1 for the first channel and the ramp signal Vramp2 for the second channel are shown by the waveforms 246, 248 and 250 at the middle portion of FIG. 10, in which the ramp signals Vramp1 and Vramp2 are identical except for the phases thereof. If a multiphase voltage regulator 160 with constant on-time control has four phases, the error signal Vc', the ramp signal Vramp1 for the first channel, the ramp signal Vramp2 for the second channel, the ramp signal Vramp3 for the third channel, and the ramp signal Vramp4 for the fourth channel are shown by the waveforms 236, 238, 240, 242 and 244 at the upper portion of FIG. 10, in which all the ramp signals Vramp1, Vramp2, Vramp3 and Vramp4 are identical except for the phases thereof.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A circuit for constant on-time control for an interleaved multiphase voltage regulator including a plurality of channels for converting an input voltage into an output voltage, the circuit comprising:
    an error amplifier monitoring the output voltage to generate a first error signal;
    an adder coupled to the plurality of channels to sum up all the channel currents thereof to generate a summation signal being combined with the first error signal to thereby generate a second error signal;
    a modulator generating a modulation signal according to the second error signal and a ramp signal;
    a lowest current comparator coupled to the plurality of channels to monitor the channel currents to select one from the plurality of channels; and
    an on-time generator coupled to the modulator and lowest current comparator, enabled by the lowest current comparator to generate a control signal according to the modulation signal to drive the selected channel.

2. The circuit of claim 1, wherein the modulator comprises a comparator comparing the second error signal with the ramp signal to trigger the modulation signal.

3. The circuit of claim 1, wherein the lowest current comparator enables the on-time generator when the channel current of the selected channel is smaller than a threshold.

4. A method for constant on-time control for an interleaved multiphase voltage regulator including a plurality of channels for converting an input voltage into an output voltage, the method comprising:
    monitoring the output voltage to generate a first error signal;
    summing up all the channel currents of the plurality of channels to generate a summation signal being combined with the first error signal to thereby generate a second error signal;
    generating a modulation signal according to the second error signal and a ramp signal;
    monitoring the channel currents to select one from the plurality of channels; and
    generating a control signal according to the modulation signal to drive the selected channel.

5. The method of claim 4, wherein the step of generating a modulation signal according to the second error signal and a ramp signal comprises comparing the second error signal with the ramp signal to trigger the modulation signal.

6. The method of claim 4, wherein the step of monitoring the channel currents to select one from the plurality of channels comprises selecting the channel having a channel current smaller than a threshold.

* * * * *